US011372858B2

(12) United States Patent
Ignatyev et al.

(10) Patent No.: US 11,372,858 B2
(45) Date of Patent: Jun. 28, 2022

(54) ESTIMATED QUERY PERFORMANCE (71) Applicant: Oracle International Corporation, Redwood Shores, CA (US)

(72) Inventors: Oleksiy Ignatyev, Belmont, CA (US); Ondrej Bohaciak, Brno (CZ)

(73) Assignee: Oracle International Corporation, Redwood Shores, CA (US)

( * ) Notice: Subject to any disclaimer, the term of this patent is extended or adjusted under 35 U.S.C. 154(b) by 911 days.

(21) Appl. No.: 15/598,600

(22) Filed: May 18, 2017

(65) Prior Publication Data

US 2018/0336247 A1 Nov. 22, 2018

(51) Int. Cl.
*G06F 16/00* (2019.01)
*G06F 16/2453* (2019.01)

(52) U.S. Cl.
CPC .. *G06F 16/24549* (2019.01); *G06F 16/24534* (2019.01); *G06F 16/24542* (2019.01)

(58) Field of Classification Search
CPC ........... G06F 16/2453; G06F 16/24542; G06F 16/2455; G06F 16/24534; G06F 16/24549; G06F 16/2462; Y10S 707/99933
See application file for complete search history.

(56) References Cited

U.S. PATENT DOCUMENTS

| | | | |
|---|---|---|---|
| 10,133,775 B1* | 11/2018 | Ramalingam | G06F 16/24542 |
| 2005/0177557 A1* | 8/2005 | Ziauddin | G06F 16/217 |
| 2005/0222965 A1* | 10/2005 | Chaudhuri | G06F 16/217 |
| 2005/0289098 A1* | 12/2005 | Barsness | G06F 16/24549 |
| 2007/0192296 A1* | 8/2007 | Burger | G06F 16/24549 |
| 2008/0040334 A1* | 2/2008 | Haber | G06F 16/24534 |
| 2008/0195578 A1* | 8/2008 | Hueske | G06F 16/217 |
| 2009/0024572 A1* | 1/2009 | Mehta | G06F 16/24542 |
| 2010/0082603 A1* | 4/2010 | Krompass | G06F 16/24542 707/719 |
| 2010/0235349 A1* | 9/2010 | Kuno | G06F 16/217 707/718 |
| 2011/0258179 A1* | 10/2011 | Weissman | G06F 16/24544 707/714 |
| 2011/0270822 A1* | 11/2011 | Denton | G06F 16/217 707/719 |
| 2012/0089596 A1* | 4/2012 | Siddiqui | G06F 16/24542 707/718 |

(Continued)

FOREIGN PATENT DOCUMENTS

WO 2016/107491 A1 7/2016

OTHER PUBLICATIONS

Tom Kyte, Estimate Query Execution Time Without Running Query, Oracle Ask Tom, https://asktom.oracle.com/pls/apex/f?p=100:11:0::::P11_QUESTION_ID:2945229900346583015 (Feb. 2, 2011).

*Primary Examiner* — Augustine K. Obisesan
(74) *Attorney, Agent, or Firm* — Invoke (57) ABSTRACT

Operations include estimating, in real time, a runtime of a query. The query optimization system receives set of query definitions for defining a target query. The system uses the set of query definition elements to determine an estimated runtime for the target query. If the estimated runtime exceeds some acceptable threshold value, then the system determines a modification to the set of query definition elements. The system uses the modification to generate a modified query, corresponding to a lower estimated runtime.

22 Claims, 5 Drawing Sheets

(56) References Cited

U.S. PATENT DOCUMENTS

| | | | |
|---|---|---|---|
| 2012/0150895 A1* | 6/2012 | Barsness | G06F 16/245 |
| | | | 707/769 |
| 2014/0143268 A1* | 5/2014 | Finkelstein | G06F 16/3322 |
| | | | 707/767 |
| 2014/0214880 A1* | 7/2014 | Chi | G06F 16/2453 |
| | | | 707/768 |
| 2016/0188696 A1* | 6/2016 | Belghiti | G06F 16/2272 |
| | | | 707/718 |
| 2016/0203404 A1* | 7/2016 | Cherkasova | G06N 5/04 |
| | | | 706/12 |
| 2017/0300536 A1* | 10/2017 | Gupta | G06F 16/24545 |
| 2018/0121505 A1* | 5/2018 | Barsness | G06F 16/24549 |

\* cited by examiner

ESTIMATED QUERY PERFORMANCE

TECHNICAL FIELD

The present disclosure relates to estimating, in real time, the runtime of a query.

BACKGROUND

A query fetches requested data from a database. Commonly, data is stored in a relational database. A relational database stores data in one or more tables. The tables are comprised of rows of data, organized into fields or columns. For example, "FirstName" and "LastName" are fields of a data table, and the number of rows therein is the number of names stored to the table.

Structured Query Language (SQL) is a language for managing data in relational databases. An SQL query is used to retrieve data based on specified criteria. Most SQL queries use the statement SELECT, which retrieves data. The SQL query may specify criteria such as FROM—to specify tables to be queried; JOIN—to specify the rules for joining tables; WHERE—to restrict the rows returned by the query; GROUP BY—to aggregate duplicative rows; and ORDER BY—to specify the order in which to sort the data. For example, the SQL query "SELECT breed, age, name FROM Dogs WHERE age <3 ORDER BY breed" will return a list of dogs under 3 years old from the table "Dogs," in alphabetical order by breed, retrieving the breed, age, and name of each dog. The output may include: "Bulldog 1 Max| Cocker Spaniel 2 Joey|Golden Retriever 1.5 Belinda."

Increasingly, databases are stored using a multi-tenant cloud architecture. In a multi-tenant cloud architecture, data from different tenants is stored using shared resources. Shared resources may be some combination of a server, a database, and/or a table, in whole or in part. Multitenancy reduces the amount of resources required to store data, saving costs. However, when multiple tenants are using a resource at the same time, it may result in slower runtimes.

A query runtime (also referred to herein as "runtime") is the time taken to execute a query. The query runtime may vary with numerous factors. Attributes of a query itself affect the query runtime. For example, the query runtime may depend on the number of rows and/or tables being queried, and what operations are to be executed on the tables. Properties of a shared cloud infrastructure also affect query runtime. For example, the query runtime may depend on the number of queries currently running by other tenants of the shared cloud infrastructure. When a user is creating a complicated SQL query on a multitenant platform, a query may take a relatively long time to execute in comparison to other queries. Due to the many factors affecting query runtime, a user does not know whether a query to-be-executed will take seconds, minutes, or hours.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. QUERY OPTIMIZATION SYSTEM
3. ESTIMATING A QUERY RUNTIME
   A. GENERATING A QUERY RUNTIME ESTIMATION MODEL
   B. ESTIMATION OF QUERY RUNTIME
4. QUERY INTERFACE
5. MISCELLANEOUS; EXTENSIONS
6. HARDWARE OVERVIEW

1. General Overview

One or more embodiments relate to a query optimization system. The query optimization system may provide information about a query to-be-executed, such as estimated performance characteristics. As an example, the query optimization system may determine an estimated query runtime for a query prior to execution of the query. The query optimization system may display the estimated query runtime for a query while receiving query definition elements for the query from a user.

In an embodiment, the query optimization system suggests modifications to a query as the query is being defined, or immediately after the query has been defined. As the definition for a query is being received, the query optimization system determines query attributes, based on any received query elements and real-time environmental conditions which may affect query performance. The query optimization system determines an estimated runtime for the target query, based at least on query attributes. The query optimization system further estimates runtimes for variations of the query definition. If the variations of the query definition correspond to a lower estimated runtime than the actual query definition, then the query optimization system suggests modification of the query definition to match one of the variations of the query definition. The query optimization system further provides an option for a user to accept a suggested modification to modify a query.

One or more embodiments described in this Specification and/or recited in the claims may not be included in this General Overview section.

2. Query Optimization System

Figure 1:
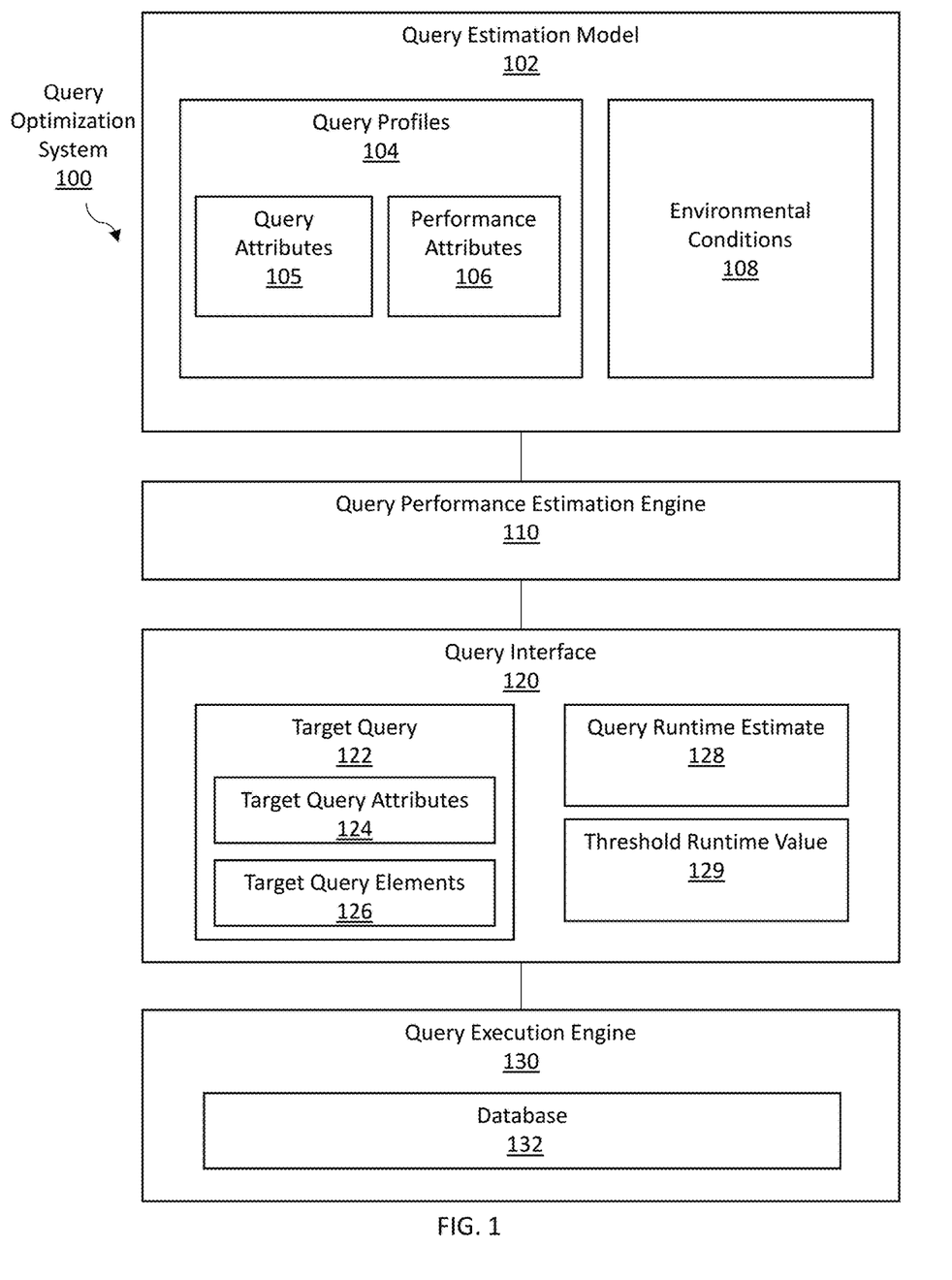
FIG. 1 illustrates a system for estimating a query runtime in accordance with one or more embodiments.

FIG. 1 illustrates a query optimization system 100 in accordance with one or more embodiments. The query optimization system 100 is a system which is designed to pre-process a query that is to be executed. Pre-processing of the query includes analyzing the query, prior to execution of query, in order to provide estimated performance information and/or suggest modifications to the query for improving the performance.

As illustrated in FIG. 1, the query optimizations system 100 includes a query estimation model 102, a query performance estimation engine 110, a query interface 120, and a query execution engine 130. In one or more embodiments, the query optimization system 100 may include more components or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the query estimation model 102 is a model for estimating query performance, for example, a query runtime. The query optimization system may use a machine learning algorithm to generate a query estimation model 102. The query estimation model 102 may correspond to a mathematical function which (a) accepts as input query attributes and/or environmental attributes, and (b) generates as output estimated query performance. The query estimation model may be a multi-variable regression model, such as a linear regression model. The query optimization system 100 may fit a query estimation model 102 using query profiles 104 of previously executed queries. Specifically, the query optimization model 102 may be used to estimate performance of a query based on (a) how other already-executed queries with similar attributes have performed and (b) current environmental conditions.

In an embodiment, query profiles 104 include data corresponding to previously executed queries. Query profiles 104 may include both the query attributes 105 and performance attributes 106 of previously executed queries.

Query attributes 105 include any attributes of a query which may affect query performance. A query attribute 105 may be a user-specified query definition element, such as a field that was requested in a previously executed query. A query attribute may be an attribute which depends upon user-specified parameters of a query and/or environmental conditions when the particular query was executed. Query attributes 105 may include the number of data fields requested in an SQL query, the number of rows in tables containing requested data fields, and the number of filtering (WHERE) conditions in an SQL query. Query attributes 105 may incorporate environmental conditions when a particular executed query was being executed.

Query attributes 105 may be represented as vectors. For example, the query optimization system saves the parameters "number of data fields requested by SQL query" and "number of rows in tables containing the requested data fields," for 10 executed queries $Q_i$, as an input vectors $v_i$ (where i=1, ..., 10 is an index for each of the 10 queries). For each query $Q_i$, the vector $v_i$ stores the values: (number of data fields, number of rows).

In an embodiment, performance attributes 106 are attributes describing the performance of previously executed queries. The performance of a query may include, for example, a runtime of the query. A query runtime may be calculated as the time period between transmitting a request to execute a query and receiving results from the execution of the query. For example, the system stores a vector y of runtimes for a set of previously executed queries. As an example, the performance of the query may indicate that execution of the query took 5 seconds on average. The performance of a query may indicate that execution of the query did not complete half the time.

In an embodiment, the performance attributes 106 may indicate a number, type, or severity of errors that were generated when a particular query was executed. As an example, multiple executions of a particular query may be analyzed to identify a percentage of executions with errors. The percentage of executions with errors may be stored as a performance attribute mapped to query attributes associated with the particular query.

In an embodiment, the performance attributes 106 may indicate a level of utilization of resources (such as a Central Processing Unit (CPU)) for execution of a query. As an example, multiple executions of a particular query may be analyzed to identify an average utilization of the CPU corresponding to execution of the particular query. The average utilization of the CPU may be stored as a performance attribute mapped to query attributes associated with the particular query.

In an embodiment, environmental conditions 108 include factors in a query execution environment which may affect the performance of a query. Environmental conditions 108 reflect conditions when a query is to be executed. Environmental conditions 108 may correspond to current environmental conditions if the query is to be executed immediately. If the execution of a query is to be scheduled at a future time, then the environmental conditions 108 may correspond to future expected conditions at the same future time scheduled for execution of the query. For a query executed on a shared cloud infrastructure, environmental conditions 108 may be the number of other queries concurrently running by other tenants of the shared cloud infrastructure. Another example environmental conditions 108 includes the amount of bandwidth (measured in CPU memory, hard disk memory, etc.) available when a query is to be executed.

Query profiles 104 map a query attribute or a combination of query attributes 105 to specific performance attribute(s) 106. In one example, a query profile indicates that queries executed on a table with 100 rows, searching for two fields (query attributes) takes x seconds (query performance). Alternatively or additionally, query profiles 104 map the effect of a particular query attribute 105 or combination of query attributes 105 on a performance attribute 106. As an example, a query profile indicates that any query requiring access to table FAR adds y seconds to the total runtime. Analysis of query profiles 104 may be used to determine how various query attributes affect query performance. Analysis of query profiles 104 may include determining how general query attributes (e.g., query on a table with n rows) or specific query attributes (e.g., query on table XYZ) affect query performance.

In an embodiment, the query interface 120 is a user interface (UI), such as a graphical user interface (GUI). The query interface may present components for defining a target query. As an example, the query interface may include text boxes, radio buttons, and drop down menus. The query interface 120 may accept user-specified and/or user-selected elements for defining the target query 122.

The user-specified and/or user-selected elements, which define a target query 122, are referred to herein as target query elements 126. Target query elements 126 may include, for example, data fields in a table selected by a user for retrieval. Examples of target query elements include: campaign description, category, and customer name, assets, costs, and earnings. A target query element 126 may include an operation to be completed in a query, such as SELECT or JOIN.

In an embodiment, target query attributes 124 are attributes or characteristics of a target query that the system uses in estimating a runtime for a corresponding target query 122. Queries with similar attributes are expected to have similar performance values. The target query attributes 124 are determined based on the elements of the target query (e.g., target query elements 126). Examples of target query attributes include, for example, the number of data fields requested by a query and the number of WHERE conditions in a query.

In an embodiment, a query interface presents information describing an estimated performance of a target query. The estimated performance of a query may be presented with respect to performance attributes 106, described above. Estimated performance values, corresponding to a target query, may include an estimated runtime 128, a resource utilization estimate, a likelihood of error, an error rate estimate, an error type estimate, and a likelihood of timeout (most performance attributes not illustrated in the figures).

In an embodiment, the query interface 120 displays an estimated query runtime 128. As described above, a query runtime may be calculated as the time period between transmitting a request to execute a query and receiving results from the execution of the query. An estimated query runtime 128 of a target query is an estimate of the query runtime of the target query, prior to actual execution of the target query, i.e., when the actual query runtime is not known. In one example, which should not be construed as limiting the scope of the claims, the estimated query runtime 128 is computed using the following formula:

runtime=$K_1$*(number of data fields requested)+$K_2$*(number of rows in tables containing requested data fields)+$K_3$*(number of JOIN operations required to execute SQL query)

where $K_1$, $K_2$, and $K_3$ are constants.

In an embodiment, the query interface 120 may present feedback regarding a target query in addition to or as an alternate to estimated runtime. The query interface 120 may present icons or images which represent categories associated with the estimated runtime. In an example, the query interface 120 represents estimated runtime using three categories: good, fair, and poor. The category for a query may be determined based on the estimated runtime, and/or based on any other estimated performance values described above. Queries that are determined to be good queries, based on estimated performance, may be presented with a green color and/or a smiley face. Queries that are determined to be fair queries, based on estimated performance, may be presented with a yellow color and/or a neutral face. Queries that are determined to be poor queries, based on estimated performance, may be presented with a red color and/or a sad face. For an advanced user, the query interface 120 may display additional detail. The query interface may optionally display an analyze button which, when selected, causes the query interface to display a cost model. A cost model may be a statistical model showing the respective effect of target query elements 126 and/or target query attributes 124 on computation of the estimated performance.

In an embodiment, the threshold runtime value 129 (also referred to herein as an acceptable threshold value) is a configurable threshold for identifying excessive runtimes. Queries with estimated runtimes above the threshold runtime value 129 may be identified to a user as candidates for modification. The system may establish multiple threshold runtime values 129 associated with different types of queries, or the system may use one threshold runtime value for all types of queries. The threshold runtime value 129 may vary depending on the complexity of a search and/or user preference. The query interface may allow a user to set an acceptable threshold runtime value 129. Alternatively, the query optimization system may set a threshold runtime value 129 based on the likelihood of a timeout. The query optimization system may set a threshold runtime value 129 based on typical query times for similar queries. Examples of threshold runtime values include 20 seconds, 5 minutes, 20 minutes, 1 hour, and 5 hours.

In one or more embodiments, the query performance estimation engine 110 includes hardware and/or software components for estimating query performance. The query performance estimation engine 110 may include functionality to parse received target query elements 126. The query performance estimation engine 110 may include functionality to determine target query attributes 124 based on the target query elements 126. The query performance estimation engine 110 may include functionality to filter target query elements 126 to determine which target query elements are pertinent to query runtime estimation. The query performance estimation engine 110 may include functionality to fit target query attributes to a query estimation model, to determine an estimated runtime for a target query. The query performance estimation engine may include functionality to generate and/or update a query estimation model 102, using previously executed query attributes.

In an embodiment, the query execution engine 130 includes hardware and/or software configured to execute a query. The query execution engine 130 may, for example, receive an SQL query for execution. Alternatively, the query execution engine may analyze target query elements to generate an SQL query. The query execution engine may transmit an SQL query to appropriate database(s). The query execution engine may perform computations to execute a query. For example, the query execution engine may sum data, average data, and combine tables in whole or in part. The query execution engine may retrieve query results from one or more databases.

In an embodiment, the database 132 is a database storing data to be retrieved by a query. The database 132 may be a relational database comprising tables. The database 132 may be implemented on a multi-tenant platform, such that resources are shared among multiple tenants.

3. Estimating a Query Runtime

A. Generating a Query Runtime Estimation Model

Figure 2A:
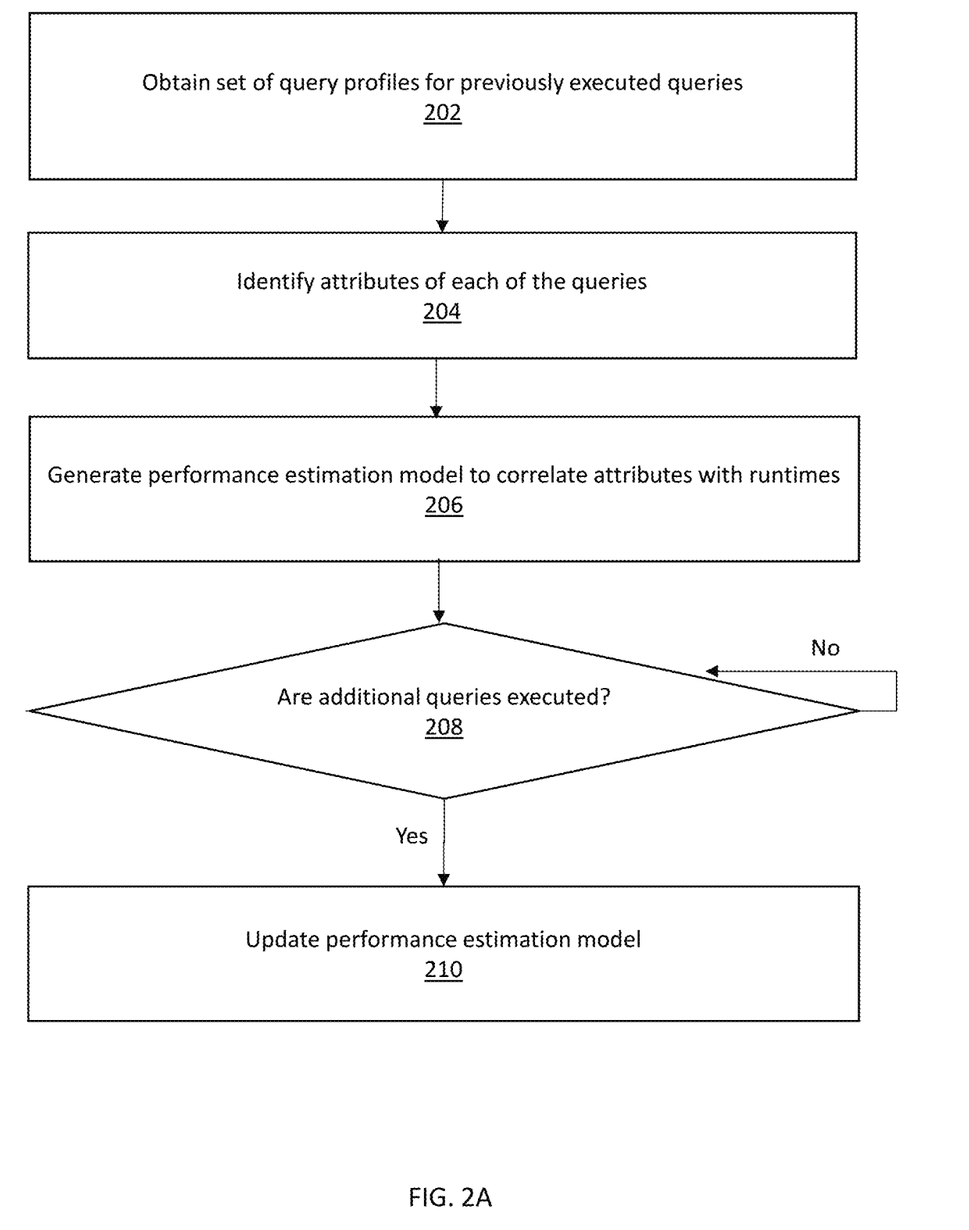
FIG. 2A illustrates an example set of operations for generating a query runtime estimation model in accordance with one or more embodiments.

FIG. 2A illustrates an example set of operations for generating various query performance estimation models, in accordance with one or more embodiments. Some of the example set of operations described below, specifically describe generating a query runtime estimation model. However, a similar or modified set of operations may be executed for any query performance estimation model. One or more operations illustrated in FIG. 2A may be modified, rearranged, or omitted altogether. Accordingly, the particular sequence of operations illustrated in FIG. 2A should not be construed as limiting the scope of one or more embodiments.

In an embodiment, the query optimization system obtains a set of query profiles of previously executed queries (Operation 202). The set of query profiles may be submitted to the query optimization system via a file input, an object retrieval process, or via any other operation executable by the query optimization system. In one example, each query profile may be stored as a vector $v_i$. The first element of $v_i$ is the runtime (measured in seconds) of a query. Elements 2-8 of $v_i$ are the following query attributes:

1) the number of query definition elements in a structured query language (SQL) query
2) the number of rows in tables containing the requested query definition elements
3) the number of filtering (WHERE) conditions in the SQL query
4) the number of JOIN operations required to execute the SQL query
5) the number of other SQL queries running by other tenants of a shared cloud infrastructure at the time the query is to be executed
6) the amount of bandwidth available on the shared cloud infrastructure at the time the query is to be executed
7) the time the query is to be executed In an embodiment, the query optimization system identifies attributes of each of the queries (Operation 204). The query optimization system may identifying each of the attributes of each of the queries by parsing the vectors $v_i$ above. Alternatively or additionally, the query optimization system may use the vectors $v_i$ as input vectors. The query optimization system may combine the vectors $v_i$ into a matrix to use in generating a query estimation model. The query optimization system may standardize or normalize the vectors $v_i$.

In an embodiment, the query optimization system generates a performance estimation model to correlate query attributes with query runtimes (Operation 206). The query optimization system may fit query data from the query profiles to any model known in the art. For example, the query optimization system may use as a multivariate regression model, such as a multivariate linear regression model.

For example, the query optimization system may fit query profiles to a ridge regression model as a function of query attributes. The query optimization system may generate a model using the formula:

$$\hat{y}(w,x) = w_0 + w_1 x_1 + \ldots + w_p x_p \quad (1)$$

where p=the number of query attributes. The vector $$w = (w_1, \ldots, w_p) \quad (2)$$

is designated as a vector of coefficients. The ridge coefficients minimize a penalized residual sum of squares, $$\min_w \|Xw - y\|_2^2 + \alpha \|w\|_2^2 \quad (3)$$

where matrix X comprises rows of different vectors a corresponding to past observed SQL queries. The query optimization system stores observed query runtimes to vector y. $\alpha$ is a complexity parameter that controls the amount of shrinkage; $\alpha \geq 0$. The larger the value of $\alpha$, the greater the amount of shrinkage. As shrinkage increases, the coefficients become more robust to collinearity.

The query optimization system may fit the query estimation model, using query profiles, to estimate the vector of coefficients (2) by minimizing the penalized residual sum of squares (3). The query optimization system may use the estimated vector of coefficients (2), along with any specific vector x, to estimate the query run time of a particular query.

As an optional additional step, the query optimization system may initially run the query attributes through an attribute importance algorithm to select query attributes which have some meaningful correlation with query runtime. The query optimization system may then fit a model to the selected query attributes which pass the attribute importance test.

In an embodiment, the query optimization system determines whether additional queries are executed (Operation 208). The query optimization system may continuously monitor the query execution engine to detect a newly executed query. A push or pull mechanism may be implemented to continuously or periodically transmit query profiles for executed queries to the query optimization system.

If additional queries are executed, then the query optimization system updates the performance estimation model based on the query profiles (Operation 210). Each time a query is executed, the query optimization system may update the a and y vectors of stored historical query data, and repeat the steps of Operation 206 with the updated stored values. Alternatively or additionally, the query optimization system may periodically fit the query estimation model to a stored set of query attributes. For instance, the query optimization system may update the query estimation model monthly or quarterly.

As an example, the query optimization system generates a query runtime estimation model, using historical search data comprising query attributes, performance attributes, and environmental attributes. The query optimization system stores historical search data to vectors where the elements of the vectors $a_i$ are stored query attributes from historical queries:

$a_i$=(number of data fields requested by SQL query, number of JOIN operations required to execute SQL query, number of other SQL queries concurrently running by other tenants of shared infrastructure)

The query optimization system stores a vector $a_i$ for each historical query. Here, we have three stored vectors based on three historical queries:

$a_1$=(100, 1, 5)
$a_2$=(15, 0, 0)
$a_3$=(1000, 2, 10)

The query optimization system uses the three vectors to generate matrix X. The query optimization system will use X in fitting the data to a ridge regression model. The query optimization system also generates a vector y of runtimes for each of the three queries: y=[$y_1$, $y_2$, $y_3$]=[10 minutes, 10 seconds, 4 hours].

The query optimization system fits the data to the equation $$\hat{y}(w,x) = w_0 + w_1 x_1 + \ldots + w_p x_p \quad (1)$$

by minimizing the squares $$\min_w \|Xw - y\|_2^2 + \alpha \|w\|_2^2 \quad (3)$$

via vector of coefficients $$w = (w_1, \ldots, w_p) \quad (2)$$

The calculated vector of coefficients is:

$$w = (4, 0.2, 1.3)$$

Using the calculated vector of coefficients w, the query optimization system generates the model $$\hat{y}(w,x)=0.3+4x_1+0.2x_2+1.3x_3$$

which yields query runtime as a function of the number of data fields requested by an SQL query, the number of JOIN operations required to execute SQL query, and the number of other SQL queries concurrently running by other tenants of shared infrastructure At a later time, the system executes an additional query. The query optimization system generates a new vector of query attributes, $a_4$=(502, 0, 5). The query optimization system appends $a_4$ to X. The query optimization system updates they vector with the query runtime for the additional query, 30 seconds.

The query optimization system updates the query estimation model, by again minimizing the squares (3) via the vector of coefficients (2) with the updated X and y values. With the new input values, query runtime estimation model changes. The query optimization system uses the updated vector of coefficients to update the query estimation model to $$\hat{y}(w,x)=0.3+4x_1+0.1x_2+1.5x_3$$

B. Estimation of Query Runtime

Figure 2B:
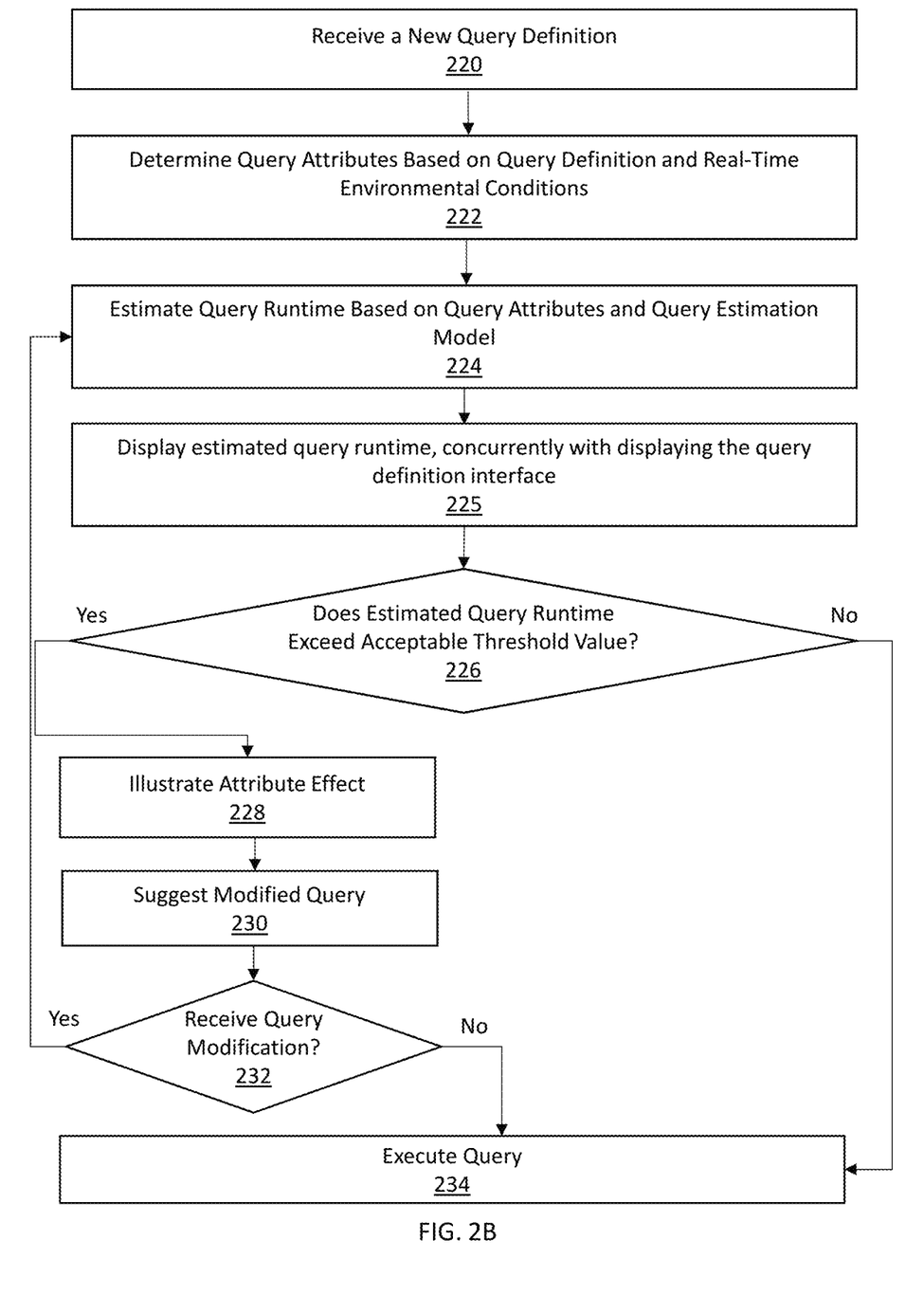
FIG. 2B illustrates an example set of operations for estimating a query runtime in accordance with one or more embodiments.

FIG. 2B illustrates an example set of operations for estimating query performance, in accordance with one or more embodiments. Some of the examples relate specifically to estimating a query runtime, however, similar operations are equally applicable to estimating other kinds of query performance characteristics. One or more operations illustrated in FIG. 2B may be modified, rearranged, or omitted altogether. Accordingly, the particular sequence of operations illustrated in FIG. 2B should not be construed as limiting the scope of one or more embodiments.

In one or more embodiments, the query performance estimation engine receives a new query definition (Operation 220). The query performance estimation engine may receive the new query definition via user input submitted through the query interface. The query definition may include target query elements selected and/or specified by a user.

In an embodiment, the query optimization system determines query attributes based on the query definition and real-time environmental conditions (Operation 222). The query attributes may be determined as the query definition is being received, before receiving the complete query definition and/or after receiving the complete query definition. In an example, the query attributes identify characteristics of table(s) associated with the query definition. The query optimization system may analyze one or more tables in the database, to determine which table(s) store the requested target query elements. For example, the query optimization system may determine, based on received data fields, the number of rows in tables containing the requested data fields. The number of rows is determined to be a query attribute for the target query. The query optimization system may use environmental conditions as a target query attribute. For example, the query optimization system may detect the number of other SQL queries currently being executed by other tenants of a shared cloud infrastructure. The number of other SQL queries is selected as a query attribute.

In an embodiment, the query performance estimation engine estimates the query runtime based on query attributes and the query estimation model (Operation 224). The query optimization system may input target query attributes to a query estimation model to estimate the runtime of the query. For example, the query estimation model may input target query attributes $x_1$=0, $x_2$=50 to the query estimation model $\hat{y}(w, x)$=0.3+2$x_1$+0.3$x_2$. Based on the input, the query estimation model generates a runtime estimate of 15.3 seconds. The query performance estimation engine may estimate the query runtime in real time, as a user enters target query elements.

In an embodiment, the query optimization system displays the estimated query runtime, concurrently with displaying the query definition interface (Operation 225). The query optimization system may display, concurrently with or on the query definition interface, estimated query performance values. As an example, the query optimization system may display an estimated runtime for a query. The query optimization system may display an icon (e.g., a sad face or a happy face) based on the estimated performance of the query. The query optimization system may highlight text (e.g., the query definition elements, and/or estimated runtime) with colors indicative of performance categories. The runtime estimation system may display the estimated query runtime in real time, as a user enters target query elements.

In an embodiment, the query optimization system determines whether the estimated query runtime exceeds a threshold runtime value (Operation 226). The query optimization system compares the estimated query runtime to the corresponding threshold runtime value. For example, an estimated query runtime is 30 minutes, and the threshold runtime value is 20 minutes. Comparing the two runtime values, the query optimization system determines that the estimated query runtime exceeds the threshold runtime value. The query optimization system may take actions to alert a user or otherwise help a user modify the query if the estimated query runtime exceeds the threshold runtime value.

In an embodiment, if the estimated query runtime exceeds the acceptable threshold value, then the query optimization system illustrates an effect of one or more query attributes on the runtime of the query (Operation 228). The query optimization system may visually identify a particular target query element as a contributor to a significant increase in the estimated query runtime. For example, the query optimization system receives, via user input, the target query element, "User ID." User IDs are stored in a different table than the other target query elements requested. The table containing the User IDs is being heavily used by other users of a multitenant infrastructure. The query optimization system flags the User ID element as problematic. The query interface may identify the problematic target query element, for example, by highlighting the User ID field in red.

In an embodiment, if the estimated query runtime exceeds the acceptable threshold value, then the query optimization system suggests a modification to the query (Operation 230). The query optimization system may suggest one modification or several modifications to the query. The query optimization system may, for example, suggest editing the content of one or more fields, removing fields, or rescheduling the query execution. The query optimization system may suggest a different, modified query or several modified queries from which the user can select a query for execution. The query optimization system may rank several suggested modified queries, using a priority score of query definition elements, based on the estimated query execution time.

The query optimization system may select a modified query by modifying a target query attribute and calculating an estimated runtime for the modified query, replacing the original target query attribute with the modified query attribute. The query optimization system may repeat the above process for multiple modified target query attributes. The query optimization system may select one or more modified queries with the lowest estimated query runtimes.

In an example, the query interface receives a new target query definition. The target query has two joins, 1 million rows, 15 target query elements, one filtering condition, and is to be performed at 10 am. The estimated target query runtime is one hour. The query optimization system calculates modified queries, by modifying each parameter, in turn. The query optimization system modifies each parameter by a reasonable increment. First, the system changes the number of joins from two to one. The modified number of joins, in turn, reduces the number of tables, and the number of rows, required to execute the query. This first modified query has an estimated runtime of 20 minutes. For a second modified query, the query optimization system replaces the time in the target query definition, 10 am, with the modified time 8 μm. The second modified query has an estimated query runtime of 30 minutes. For a third modified query, the query optimization system replaces the number of rows, 1 million, with 70,000 rows with the largest number of accesses, resulting in a respective estimated runtime of 15 minutes.

In an embodiment, a user may accept a modification proposed by the query optimization system, or make another modification in response to viewing the estimated query performance. The query optimization system determines whether a query modification has been received (Operation 232). The query performance estimation engine may communicate with the query interface to determine whether a modified query has been received.

If the query optimization system receives a query modification, then the query optimization system estimates the query runtime, based on updated query attributes corresponding to the modified query, and re-executes Operation 224 described above.

If the query interface has not received a query modification then the system executes the query (Operation 234). For example, if a user proceeds with the original target query without modification, the query performance estimation engine may transmit an instruction, to the query execution engine, to execute the original target query. Upon receiving an instruction to execute the query, the query execution engine executes the query.

The query execution engine may execute the query by retrieving data from a database, performing operations on data, and/or causing display of query results. For example, the query execution engine may execute a query by retrieving data from three data fields in one table, and retrieving data from two data fields in another table. The query execution engine then merges the data fields into one new table, and displays the new table via the query interface. Alternatively, the output of the query may be displayed elsewhere, such as by exporting the query output table to an Excel spreadsheet.

The query execution engine may execute a query as soon as all parameters are received. Alternatively, the query execution engine may wait to execute a query until instructions for initiating the execution of the query are received from a user. For example, the query interface may include a radio button, "Execute Query," that a user can activate to initiate execution of the query, once the user is satisfied with estimated performance displayed for the query as currently defined by the user.

In an embodiment, 228-232 may be skipped if the estimated query runtime does not exceed the threshold value. The presentation of estimated query performance may be presented by the query optimization system only if certain conditions are met. As an example, the query optimization system suggests modifications to a query only if the estimated query runtime is below a threshold runtime value. In other embodiments, the query optimization system may always suggest modifications to improve query runtime as long as any of the modifications As an example, the query interface receives, from user input, a new query definition. The query interface receives, via user input, three target query elements. No JOIN operations are required to execute the query. Observing parameters 1-7 in paragraph [0041], the query performance estimation engine estimates the runtime of the query, by plugging the values of parameters 1-7, for the target query, into the query estimation model (i.e., equation (1) in paragraph [0044]). The output of the query estimation model is an estimated query runtime of 2 minutes. The query definition interface displays the suggested runtime of two minutes in real time. The query optimization system then compares the estimated query runtime of 2 minutes to a stored acceptable threshold value, 1 hour.

At this point, the query interface receives, via user input, one filtering (WHERE) condition to add to the query. In real-time, the query performance estimation engine re-estimates the runtime of this modified query, according to the new values of parameters 1-7. The query optimization system displays the new estimated runtime to the user immediately. With the added WHERE condition, the estimated runtime is now 5 minutes, still well below the acceptable threshold value of 1 hour.

The query interface again receives, via user input, a modified target query. The user requests a fourth data field, which would require one JOIN operation. In real time, the query performance estimation engine re-estimates the runtime of the modified query, according to the new values of parameters 1-7. The query optimization system displays the new estimated runtime to the user immediately. Now, the modified query is estimated to take 1.5 hours. As a result, the estimated query runtime now exceeds the acceptable threshold value of an hour. The query optimization system illustrates the attribute effect, by flagging the fourth data field in red. Flagging the fourth data field in red illustrates to the user that the fourth data field is causing an unacceptably high estimated runtime. The query optimization system further suggests a modified query—remove the fourth target query element.

The user decides to remove the fourth target query element, as suggested. Upon receiving the modified query definition, the query optimization system recalculates the estimated runtime, without the fourth target query element. Once again, the query optimization system displays an estimated runtime, now equal to 2 minutes. The user finds the modified target query agreeable, and clicks a "run query" button. The query optimization system executes the target query.

4. Query Interface

Figure 3A:
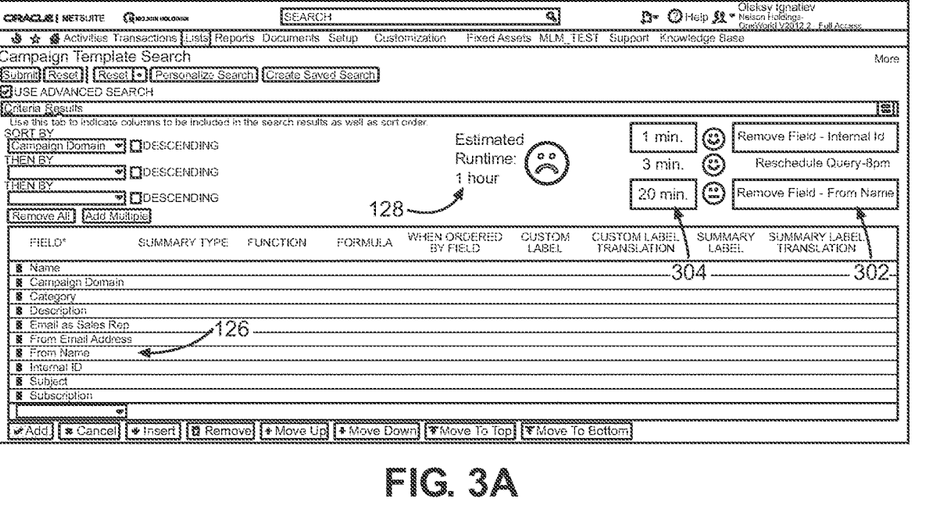
FIGS. 3A-3B illustrate examples of user interfaces with estimated query runtimes.

FIG. 3A illustrates an example of a query interface displaying estimated query runtimes. One or more components of the query interface as illustrated in FIG. 3A may be modified, rearranged, or omitted altogether. Accordingly, the interface components illustrated in FIG. 3A should not be construed as limiting the scope of one or more embodiments.

FIG. 3A illustrates a query interface being used by a user that is searching for information regarding a sales campaign. The query interface displays a series of target query elements 126 that have been selected by a user. The query interface has received, via user input, the target query elements: "Name," "Campaign Domain," "Category," "Description," "Email as Sales Rep," "From Email Address," "From Name," "Internal ID," "Subject," and "Subscription."

The query interface further displays an estimated query runtime 128. The query interface displays the estimated query runtime 128, as soon as the query interface has received a portion or all of a user's selected target query elements. The query interface may update the query time as each target query element is added or removed. In this example, the estimated runtime is displayed with a numeric time estimate (one hour), an icon (sad face), and a color code (red), indicating that poor performance has been estimated for the target query as currently defined via the query interface.

The query interface displays suggested query modifications 302 with corresponding estimated performance 304. The suggested query modifications include:

a. Removing the field internal id, which would result in an estimated runtime of one minute. (A one-minute runtime falls into a good query performance category, and is therefore shown with a green smiley face)

b. Scheduling or rescheduling the query to execute at 8 μm, which would result in an estimated runtime of three minutes. (A three-minute runtime falls into a good query performance category, and is therefore shown with a green smiley face).

c. Removing the field From Name, which would result in an estimated runtime of twenty minutes. (A twenty-minute runtime falls into a fair query performance category, and is therefore shown with a yellow neutral face).

Figure 3B:
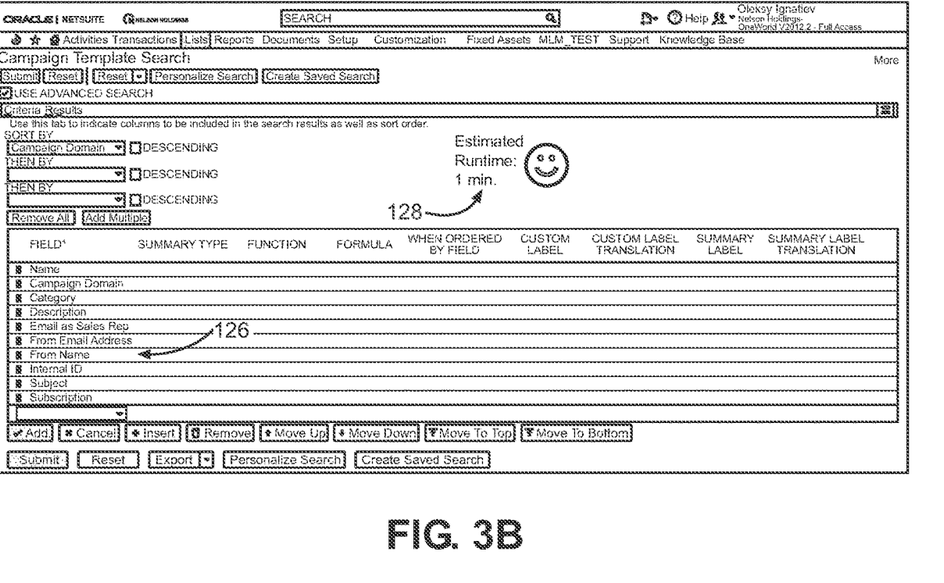

A user reviews the three query modifications (a)-(c) above as suggested by the query optimization system. A user selects modification (a) to remove the field internal id. In response to the user's selection of modification (a), the field internal id is removed as illustrated in FIG. 3B. Furthermore, the estimated runtime 128 is updated to one minute. An estimated runtime of one minute is determined to be within a good category of query performance. As a result, the estimated runtime of one minute is presented with a green smiley face icon.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
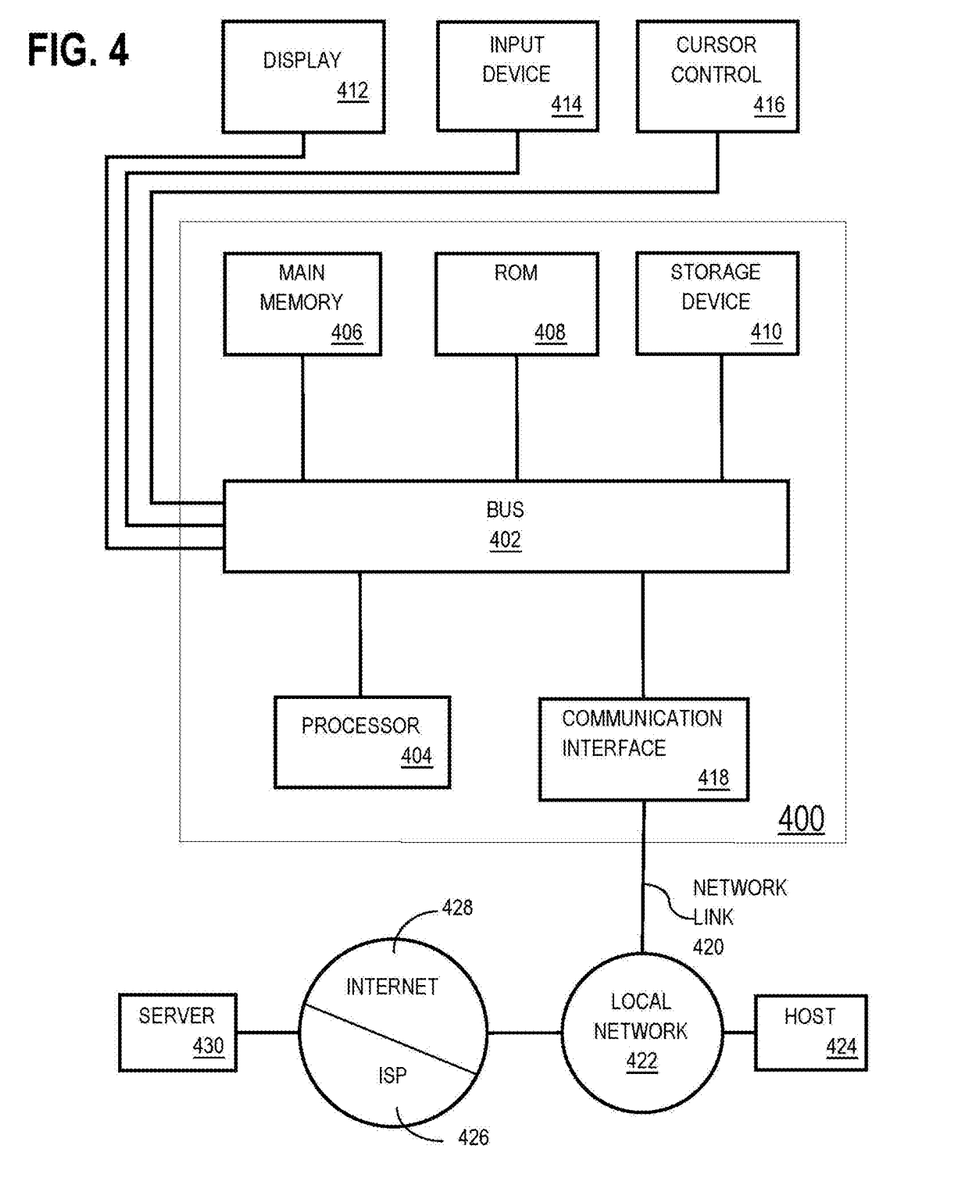
FIG. 4 illustrates a block diagram of a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    determining values for a set of query attributes associated with a target query, the values for the set of query attributes comprising a set of one or more query definition elements defining the target query and a future time at which execution of the target query is scheduled;
    wherein the target query is to be executed on a multi-tenant cloud system; and
    determining a number of other queries expected to be executed concurrently with the target query at the future time;
    wherein determining the number of other queries expected to be executed concurrently with the target query at the future time comprises: identifying a query of another tenant in the multi-tenant cloud system as being within the other queries expected to be executed concurrently with the target query at the future time;
    determining an estimated runtime for the target query based at least on the set of query definition elements and the number of other queries expected to be executed concurrently with the target query at the future time;
    identifying a first modification to at least one of the values for the set of query attributes, wherein execution of the target query with the first modification is associated with a first estimated runtime lower than the estimated runtime;
    identifying a second modification to at least one of the values for the set of query attributes, wherein execution of the target query with the second modification is associated with a second estimated runtime lower than the estimated runtime; and concurrently presenting, on a user interface, information identifying at least the first modification to the set of query attributes and the second modification to the set of query attributes, ranked based on at least the first estimated runtime and the second estimated runtime.

2. The medium of claim 1, wherein the operations further comprise:
further ranking the two or more modifications to the set of query definition elements based on a priority score of query definition elements.

3. The medium of claim 1, wherein the first estimated runtime for the target query is determined using a linear regression model.

4. The medium of claim 1, wherein the operations further comprise:
determining a set of one or more runtimes for a plurality of previously executed queries; and
determining the first estimated runtime for the target query as a function of the set of runtimes for the plurality of previously executed queries.

5. The medium of claim 4, wherein the operations further comprise:
determining a set of one or more runtimes for a plurality of previously executed queries; and
determining the first estimated runtime for the target query using a machine learning algorithm trained with the set of runtimes for the plurality of previously executed queries.

6. The medium of claim 1, wherein the first estimated runtime for the target query is determined in real time as the set of one or more query definition elements for defining the target query is received.

7. The medium of claim 1, wherein the operations further comprise:
determining a number of query definition elements in the target query; and
determining the first estimated runtime for the target query based on the number of query definition elements in the target query.

8. The medium of claim 1, wherein the first estimated runtime for the target query is determined based on a number of WHERE conditions in the target query.

9. The medium of claim 1, wherein the first estimated runtime for the target query is determined based on a number of JOIN operations required to execute the target query.

10. The medium of claim 1, wherein the operations further comprise:
concurrently presenting (a) information identifying at least the first modification to the first value of the values for set of query attributes and the second modification to the second value of the values for the set of query attributes and (b) the first estimated runtime for the target query with the first modification and the second estimated runtime for the target query with the second modification.

11. The medium of claim 1, wherein the operations further comprise:
presenting information identifying an effect of one or more of the set of query definition elements on computation of the estimated runtime.

12. The medium of claim 1, wherein the first modification to the first value of the values for the set of query attributes comprises: rescheduling the execution of the target query from the future time to a second future time.

13. A non-transitory computer readable medium comprising instructions which, when executed by one or more hardware processors, causes performance of operations comprising:
presenting a user interface for defining a target query;
receiving, via the user interface, a set of one or more query definition elements for defining a target query;
wherein the target query is to be executed on a multi-tenant cloud system;
prior to execution of the target query, determining an estimated runtime for the target query based at least on the set of query definition elements and a number of other queries expected to be executed concurrently with the target query at a future time at which execution of the target query is scheduled;
wherein determining the estimated runtime for the target query based at least on the number of other queries expected to be executed concurrently with the target query at the future time comprises: identifying a query of another tenant in the multi-tenant cloud system as being within the other queries expected to be executed concurrently with the target query at the future time;
displaying the estimated runtime for the target query concurrently with presenting the user interface for defining the target query;
identifying a first modification to at least a first value of values for a set of query attributes, wherein execution of the target query with the first modification is associated with a first estimated runtime lower than the estimated runtime, and wherein the values for the set of query attributes comprises the set of query definition elements and the future time at which execution of the target query is scheduled;
identifying a second modification to at least a second value of the values for the set of query attributes, wherein execution of the target query with the second modification is associated with a second estimated runtime lower than the estimated runtime; and
presenting information identifying at least the first modification to the first value of the values for the set of query attributes and the second modification to the second value of the values for the set of query attributes, ranked based on at least the first estimated runtime and the second estimated runtime, concurrently with presenting the user interface for defining the target query.

14. The medium of claim 13, wherein the first estimated runtime for the target query is determined using a linear regression model.

15. The medium of claim 13, wherein the operations further comprise executing a selected query from a set comprising the target query and the target query with the first modification and the target query with the second modification.

16. The medium of claim 13, wherein the operations further comprise:
concurrently presenting (a) information identifying at least the first modification to the first value of the values for set of query attributes and the second modification to the second value of the values for the set of query attributes and (b) the first estimated runtime for the target query with the first modification and the second estimated runtime for the target query with the second modification.

17. The medium of claim 13, wherein the operations further comprise:
presenting information identifying an effect of one or more of the set of query definition elements on computation of the estimated runtime.

18. A non-transitory computer readable medium comprising instructions which, when executed by one or more hardware processors, causes performance of operations comprising:
identifying a set of one or more previously executed queries;
obtaining first respective values for a first query attribute associated with the set of previously executed queries;
obtaining second respective values for a second query attribute associated with the set of previously executed queries;
obtaining third respective values for a query performance attribute associated with the set of previously executed queries;
selecting the first query attribute, without selecting the second query attribute, wherein a first correlation between the first query attribute and the query performance attribute is greater than a second correlation between the second query attribute and the query performance attribute;
generating a query performance estimation model based at least on the first query attribute, without using the non-selected second query attribute;
obtaining a particular value for the first query attribute associated with a target query;
applying the query performance estimation model to at least the particular value for the first query attribute associated with the target query to obtain an estimated value for the query performance attribute;
presenting or storing the estimated value for the query performance attribute.

19. The medium of claim 18, wherein the estimated performance value comprises an estimated runtime for the target query.

20. The medium of claim 18, wherein the set of previously executed queries is identified in response to determining that execution of each of the set of previously executed queries and execution of the target query include substantially similar operations.

21. A non-transitory computer readable medium comprising instructions which, when executed by one or more hardware processors, causes performance of operations comprising:
determining values for a set of query attributes associated with a target query, the values for the set of query attributes comprising a set of one or more query definition elements defining the target query and a future time at which execution of the target query is scheduled;
determining a number of other queries expected to be executed concurrently with the target query at the future time;
determining an estimated runtime for the target query based at least on the set of query definition elements and the number of other queries expected to be executed concurrently with the target query at the future time;
determining one or more of an estimated number of errors that is generated responsive to execution of the target query, and an estimated severity of error that is generated responsive to execution of the target query;

identifying a first modification to at least one of the values for the set of query attributes;
wherein execution of the target query with the first modification is associated with a first estimated runtime lower than the estimated runtime; and
wherein execution of the target query with the first modification is further associated with one or more of: a first estimated number of errors that is lower than the estimated number of errors, and a first estimated severity of error that is lower than the estimated severity of error;
identifying a second modification to at least one of the values for the set of query attributes, wherein execution of the target query with the second modification is associated with a second estimated runtime lower than the estimated runtime; and
concurrently presenting, on a user interface, information identifying at least the first modification to the set of query attributes and the second modification to the set of query attributes, ranked based on at least the first estimated runtime and the second estimated runtime.

22. A non-transitory computer readable medium comprising instructions which, when executed by one or more hardware processors, causes performance of operations comprising:
presenting a user interface for defining a target query;
receiving, via the user interface, a set of one or more query definition elements for defining a target query;
prior to execution of the target query, determining an estimated runtime for the target query based at least on the set of query definition elements and a number of other queries expected to be executed concurrently with the target query at a future time at which execution of the target query is scheduled;
determining one or more of an estimated number of errors that is generated responsive to execution of the target query, and an estimated severity of error that is generated responsive to execution of the target query;
displaying the estimated runtime for the target query concurrently with presenting the user interface for defining the target query;
identifying a first modification to at least a first value of values for a set of query attributes;
wherein execution of the target query with the first modification is associated with a first estimated runtime lower than the estimated runtime;
wherein execution of the target query with the first modification is further associated with one or more of: a first estimated number of errors that is lower than the estimated number of errors, and a first estimated severity of error that is lower than the estimated severity of error; and
wherein the values for the set of query attributes comprises the set of query definition elements and the future time at which execution of the target query is scheduled;
identifying a second modification to at least a second value of the values for the set of query attributes, wherein execution of the target query with the second modification is associated with a second estimated runtime lower than the estimated runtime; and
presenting information identifying at least the first modification to the first value of the values for the set of query attributes and the second modification to the second value of the values for the set of query attributes, ranked based on at least the first estimated runtime and the second estimated runtime, concurrently with presenting the user interface for defining the target query.

* * * * *

UNITED STATES PATENT AND TRADEMARK OFFICE
CERTIFICATE OF CORRECTION

PATENT NO. : 11,372,858 B2
APPLICATION NO. : 15/598600
DATED : June 28, 2022
INVENTOR(S) : Ignatyev et al.

It is certified that error appears in the above-identified patent and that said Letters Patent is hereby corrected as shown below:

In the Specification

In Column 5, Line 41, after "query)" insert -- , --, therefor.

In Column 7, Line 42, after "$w_p x_p$" insert -- , --, therefor.

In Column 8, Line 28, after "vectors" insert -- $a_i$, --, therefor.

In Column 8, Line 34, delete "infrastructure)" and insert -- infrastructure). --, therefor.

In Column 8, Line 62, after "$w_p$)" insert -- . --, therefor.

In Column 9, Line 4, after "$1.3x_3$" insert -- , --, therefor.

In Column 9, Line 9, delete "infrastructure" and insert -- infrastructure. --, therefor.

In Column 11, Line 18, delete "8 μm." and insert -- 8 pm. --, therefor.

In Column 12, Line 7, delete "modifications" and insert -- modifications. --, therefor.

In Column 13, Lines 24-25, delete "8 μm," and insert -- 8 pm, --, therefor.

In Column 13, Line 28, delete "face)" and insert -- face). --, therefor.

Signed and Sealed this
Sixth Day of December, 2022

Katherine Kelly Vidal
*Director of the United States Patent and Trademark Office*